(12) United States Patent
Jones

(10) Patent No.: US 6,848,015 B2
(45) Date of Patent: Jan. 25, 2005

(54) ARBITRATION TECHNIQUE BASED ON PROCESSOR TASK PRIORITY

(75) Inventor: Phillip M. Jones, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 460 days.

(21) Appl. No.: 09/998,514

(22) Filed: Nov. 30, 2001

(65) Prior Publication Data

US 2003/0105911 A1 Jun. 5, 2003

(51) Int. Cl.[7] ............................................. G06F 13/14
(52) U.S. Cl. ................................... 710/311; 710/306
(58) Field of Search ............................. 710/306, 308, 710/309, 310, 311, 313, 314, 315, 323

(56) References Cited

U.S. PATENT DOCUMENTS

| | | | | |
|---|---|---|---|---|
| 5,564,060 A | * | 10/1996 | Mahalingaiah et al. | 710/51 |
| 5,918,057 A | * | 6/1999 | Chou et al. | 710/260 |
| 5,956,516 A | * | 9/1999 | Pawlowski | 710/260 |
| 6,249,830 B1 | * | 6/2001 | Mayer et al. | 710/113 |
| 2001/0032286 A1 | * | 10/2001 | Pawlowski | 710/260 |

FOREIGN PATENT DOCUMENTS

| WO | WO 99/30243 A1 | * | 6/1999 | G06F/13/26 |
|---|---|---|---|---|

* cited by examiner

Primary Examiner—Glenn A. Auve

(57) ABSTRACT

A computer system including multiple CPUs inform other logic in a computer system as to the priority level (e.g., task priority) associated with the CPU or software executing thereon. The logic makes arbitration decisions regarding CPU transactions based, at least in part, on the task priorities of the various CPUs. The logic that implements this technique may be a host bridge within a computer system having multiple CPUs or in a switch or router that interconnects multiple nodes or computer systems.

28 Claims, 1 Drawing Sheet

ARBITRATION TECHNIQUE BASED ON PROCESSOR TASK PRIORITY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to a technique for arbitration (or message routing) among multiple pending requests for system resources in a computer system. Still more particularly, the invention relates to an arbitration technique based on processor task priority.

2. Background of the Invention

Modem computer system generally include a plurality of devices interconnected through a system of buses which are linked by way of one or more bridge logic units. For example, a conventional computer system typically contains one or more central processing unit ("CPUs") coupled through a host bridge to a main memory unit. A CPU bus usually couples the CPU(s) to the host bridge, and a memory bus connects the bridge to the main memory. The bridge logic typically incorporates a memory controller which receives memory access requests (such as from the CPUs) and responds by generating standard control signals necessary to access the main memory. The bridge logic may also include an interface to another bus, such as the Peripheral Component Interconnect ("PCI") bus. Examples of devices which link to such a bus include network interface cards, video accelerators, audio cards, SCSI adapters, and telephony cards, to name a few.

Because a conventional computer system includes multiple interconnected devices that function independently of each other, they often attempt to concurrently access common resources. For example, in a system having multiple CPUs, more than one CPU may need to access main memory at a given time. By way of additional example, a device coupled to the PCI bus may need to extract data from main memory at the same time that the CPU is requesting instructions stored in the main memory. Since, main memory generally can only respond to a single memory request at a time, it is generally the function of the memory controller to choose which device to service first. Such conflicts necessitate "arbitration," in which the various pending memory requests are ranked with the highest ranking requests generally being serviced first.

There are many well-known arbitration techniques. For instance, according to a fixed priority scheme, each type of cycle request (e.g., CPU to memory write, PCI to memory write, CPU read from memory, etc.) is assigned a predetermined ranking. Although some cycle requests may have the same ranking, in general some cycle requests will have rankings that are higher than other types of requests. Using such a fixed priority scheme, a memory controller, if faced with multiple pending memory access requests, simply grants memory access to the device with the highest ranking. Although simple to implement, the deficiency of this type of arbitration scheme is that a low ranking pending request may not be permitted to complete because numerous higher ranking requests are pending. This condition is called "starvation."

Another arbitration technique is the Least-Recently-Used ("LRU") algorithm. In the LRU algorithm a memory arbiter grants the request which has least recently been granted (i.e., the "oldest" request). This type of arbitration technique ensures that no one device or cycle request is starved from completing in favor of higher ranking requests. The downside of this technique is that it essentially equalizes, or fixes, the priority of all devices in the computer system, since the arbitration scheme does not take into account the urgency associated with memory transactions from certain devices. That is, the newest request may be far more critical and time sensitive than the older requests, but will not be permitted to run until all older requests have run. Further, the devices which use memory infrequently actually tend to experience shorter waits for memory access, since these devices are less likely to have recently accessed memory than are devices which access memory more frequently. As a consequence, real-time applications and devices, which need frequent and quick access to memory, may consistently lose memory arbitration to other devices under an LRU scheme. Hence, an LRU scheme, while more equitable that a fixed scheme, lacks the flexibility to allow the computer system designer to directly set the memory request priorities.

It would thus be advantageous to have an arbitration scheme that addresses the problems noted above. Despite the apparent advantages that such a system would provide, to date no such system has been developed that addresses the foregoing problems.

BRIEF SUMMARY OF THE INVENTION

The problems noted above are solved in large part by having multiple CPUs inform other logic in a computer system as to the priority level (e.g., task priority) associated with the CPU or software executing thereon. The logic makes arbitration decisions regarding CPU transactions based, at least in part, on the task priorities of the various CPUs.

In one embodiment, the logic comprises a host bridge to which a plurality of CPUs couple, as well as memory and one or more peripheral devices. Each CPU may issue a special cycle to the host bridge to inform the host bridge of that CPU's task priority. The host bridge stores the task priorities of the various CPUs and uses that information when making arbitration decisions regarding how to allocate system resources (e.g., memory, peripheral devices) to multiple pending CPU transactions.

In accordance with another embodiment, the logic comprises a switch to which multiple nodes couple. Each node may include one or more CPUs and the various nodes send messages back and forth to other nodes through the switch. Each message from a node may include a priority value pertaining to that message. The switch makes decisions as to how to route message between nodes based on the priority values.

Numerous variations on how to route the node messages or arbitrate the CPU cycles are possible. For example, the routing/arbitration decision may be made solely based on the task priorities. Alternatively, the routing/arbitration decision may be made based on the task priorities in conjunction with an anti-starvation algorithm, a tie breaking algorithm, and other criteria that must be met. Further still, criteria unrelated to task priorities can be used as the primary criteria and the task priorities can be used as tie breaking criteria.

These and other advantages will become apparent upon reviewing the following disclosures.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component and sub-components by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either a direct or indirect electrical connection. Thus, if a first device couples to a second device, that connection may be through a direct electrical connection, or through an indirect electrical connection via other devices and connections. In addition, no distinction is made between a "processor," "microprocessor," "microcontroller," or "central processing unit" ("CPU") for purposes of this disclosure. Also, the terms "transaction" and "cycle" are generally considered synonymous. The terms "task priority," "priority level," and "priority value" are all synonymous. To the extent that any term is not specially defined in this specification, the intent is that the term is to be given its plain and ordinary meaning.

DETAILED DESCRIPTION OF THE PREFERRED EMBODIMENTS

Figure 1:
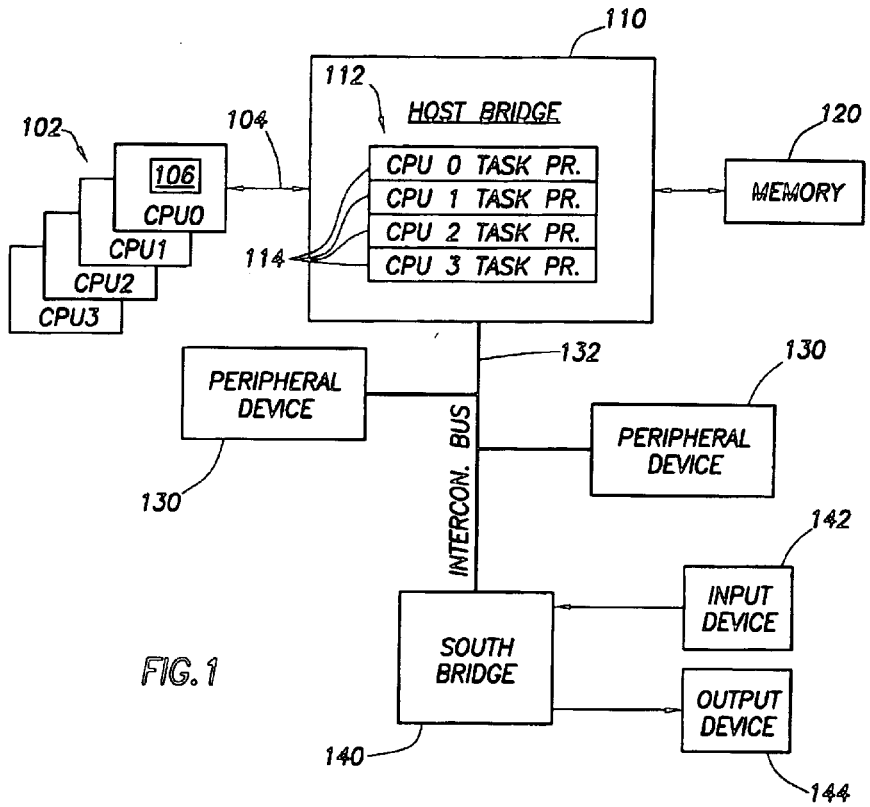
FIG. 1 shows a computer system embodying the preferred embodiment of the invention in which processor task priorities are used as part of the arbitration scheme.

Referring now to FIG. 1, system 100 is shown constructed in accordance with a preferred embodiment of the invention. As shown, system 100 includes one or more central processor units ("CPUs") 102 (also labeled as CPU0–CPU3), a host bridge 110, main memory 120, one or more peripheral devices 130, a south bridge 140 and various input and output devices 142, 144. The host bridge couples to the CPUs 102, memory 120 and the various peripheral device 130 via the south bridge 140. Other architectures are possible also; the architecture in FIG. 1 is merely exemplary of one suitable embodiment.

The peripheral device 130 may be whatever devices are appropriate for a given computer 100 such as a modem, network interface card ("NIC"), etc. The peripheral devices 130 couple to the host bridge 110 via any suitable interconnect bus 132. Of course, devices 130 are compliant with whatever interconnect bus 132 is used.

In general, one or more of the CPUs 102 can read data or instructions from and write data to memory 120 via the host bridge 110. Similarly, the peripheral devices 130 also can read/write memory 120. Further still, the CPUs 102 can run cycles through the host bridge 110 that target one or more of the peripheral devices 130. Additionally, signals to/from the input and output devices 142, 144 may propagate through the south bridge 140 and the host bridge 110 as desired. The input device 142 may be any type of device such as a mouse or keyboard and the output device may be a disk drive or other type of output device. These input/output devices may connect directly to the south bridge 140 or couple to the bridge 140 via other intervening logic (not shown) or couple to the system 100 via other architectures.

Referring still to FIG. 1, in accordance with the preferred embodiment of the invention, each CPU 102 can be assigned a "task priority." The task priority is assigned to each CPU or groups of CPUs preferably by software and may be changed as desired. The task priority may take many forms. One suitable form is a value in the range of 0 to 15. As such, there are 16 different task priorities with task priority 15 being the highest priority and 0 the lowest, or vice versa. Task priorities 0–15 represent various gradations of priority between highest and lowest. The task for which a task priority is assigned to a CPU 102 may be a program, part of a program, or low level functions such as a single memory read/write. Software can program a CPU 102 to a certain task priority by writing a task priority value to a register 106 within each CPU 102. Each CPU 102 is thus independently configurable to a desired task priority. Multiple CPUs 102 can be assigned to the same task priority if desired.

Each CPU 102 can run a cycle on bus 104 to the host bridge 110 by which the CPU informs the bridge of that CPU's current task priority. The cycle through which a task priority is transmitted to the host bridge 110 may be a cycle separate from a CPU request for a system resource such as a memory access. Alternatively, a CPU may transmit a task priority in the same cycle as the CPU request for a system resource. As shown, the host bridge 110 includes a task priority table 112, or other form of storage, in which the bridge stores the task priorities received from the CPUs 102. The task priority table 112 may include an entry 114 for each CPU 102. In the example of FIG. 1, the system 100 includes four CPUs (CPU0–CPU1) and accordingly, task priority table 112 in the host bridge 110 includes four entries, one entry corresponding to each of the four CPUs. Each entry 114 includes the ability to store the task priority for the corresponding CPU. Thus, the first entry 114 stores the CPU 0 task priority as shown, the second entry stores the CPU 1 task priority, and so on.

At any time during power on self test ("POST") or during run-time, the CPUs 102 may inform the host bridge of their task priorities and may update the task priorities at subsequent times. In accordance with the preferred embodiment, the host bridge 110 uses the CPU task priorities to make decisions about granting individual CPUs access to memory or other resources within the computer system. This technique preferably selects only between competing CPUs for system resources, and not for non-CPU related cycles such as peripheral device 130 writes to memory. However, the concept explained herein can easily be extended to devices other than CPUs and the claims which follow should be interpreted broadly enough, unless otherwise indicated by the language of the claim itself, not to be limited to just CPU-based cycles.

A non-exhaustive list of the use of CPU task priorities in making the arbitration decision with respect to CPU cycles includes:

1. Use task priority as the sole arbitration criterion
2. Use task priority as the primary arbitration criterion coupled with an anti-starvation algorithm
3. Use task priority as the primary arbitration criterion coupled with a tie-breaking algorithm
4. Use criteria unrelated to task priorities as the primary criteria, but use the CPU task priorities as way to break a tie between two or more pending CPU cycles
5. Use task priority coupled with other arbitration criteria that must be met The first algorithm is self-explanatory and states that, among multiple CPU cycles pending at the host bridge 110, the host bridge preferably selects the cycle to run that corresponds to the CPU having the highest task priority. This algorithm may have limited use, however, in that starvation may occur and that two or more CPUs may have pending cycles to run that are at an equal task priority.

The second algorithm listed above states that an anti-starvation technique is used in conjunction with the first algorithm. Any suitable anti-starvation algorithm can be used such as that described in U.S. Pat. No. 6,286,083, incorporated herein by reference. Accordingly, with this approach the CPU having the highest task priority is always selected, but other CPUs may be selected to avoid starvation should the condition so warrant.

The third algorithm says that the CPU with the highest task priority is selected by the host bridge, and that a tie breaking algorithm is used in the event that two more CPUs have the highest, yet equal, task priority. A suitable tie breaking algorithm could be a fixed priority technique such as CPU writes to memory are always selected over CPU reads.

In accordance with the fourth algorithm, other conventional arbitration techniques that are not based on CPU task priorities are used as the primary arbitration decision making technique. The host bridge 110 uses the CPU task priorities as a mechanism to break a deadlock in the event such conventional arbitration techniques are unable to select between two or more CPU cycles. That is, this technique embodies the algorithm that, all else being equal, the CPU with the highest task priority gets selected.

The fifth algorithm listed above is that CPU task priorities are used in conjunction equally with other arbitration criteria that must be met. For example, the system designer may want certain cycles to always happen in a predetermined order regardless of task priority. An example of this is when one CPU 102 having a relatively low task priority wants to write a block of data to memory 120 and another, higher task priority CPU wants to read that same data. Although the reading CPU has a higher task priority, in this situation it is generally desirable that the higher task priority reading CPU not be allowed to read the data until all of the data is written to memory by the lower priority writing CPU. The fifth algorithm thus takes into account that CPU cycles corresponding to higher task priorities should generally be permitted to run before lower task priority cycles, but certain types of predetermined activities should be permitted to occur in a different order.

Figure 2:
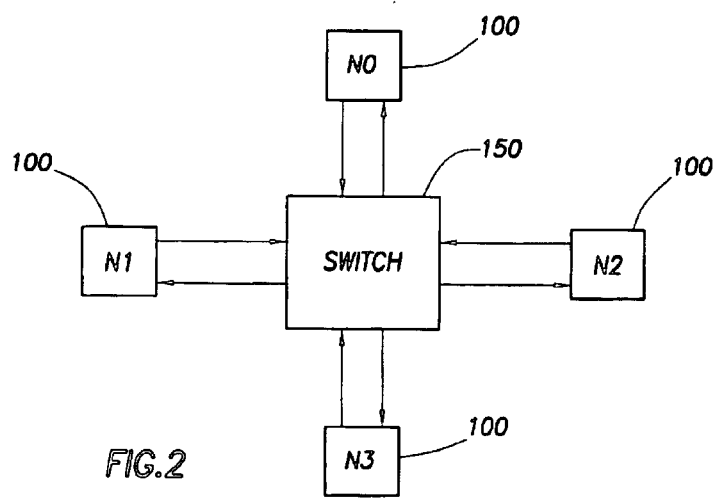
FIG. 2 shows an embodiment of the invention in which multiple nodes of computer systems are coupled together via a switch and the switch uses the processor task priorities in making its decision as to which cycles are permitted to run.

The computer system 100 shown in FIG. 1 can represent a "node" in a system in which multiple such nodes are coupled together. Further, the aforementioned use of CPU task priorities can be extended to the embodiment shown in FIG. 2 in which four nodes N0–N3 are coupled together via a switch 150. Each node represents a collection of electronic components such as the combination shown in FIG. 1, although difference components can be implemented for each node N0–N3. The switch 150 is conceptually similar to the host bridge 110 in FIG. 1 in that the switch permits each node 100 to communicate with any of the other nodes.

The switch 150 can use task priorities from each node when deciding how to route the messages between nodes. Accordingly, each node creates a message to send to another node (e.g., a write message, a read message, or a control message) and includes with the message a task priority. This type of task priority may pertain to the message itself or may pertain to a particular CPU within the node that sends the message. The switch 150 stores the messages from each node N0–N3 along with their task priorities and makes decisions on which messages to route through the switch based on the associated task priorities. The same or similar decision algorithms as explained above with regard to FIG. 1 can be implemented in switch 150.

Thus, the preferred embodiments make use of task priorities when deciding when to route a message through a system. Broadly stated, a plurality of CPUs (or nodes) couple through logic (e.g., a host bridge, a switch, etc.) to one or more system resources (e.g., memory, NICs, modems, other CPUs or nodes, etc.) and the logic uses information associated with each CPU that indicates the priority level of each CPU or software executing on each CPU. Allocation of system resources is accordingly weighted in favor of the most critical or important activities. Because the priority associated with a given transaction is taken into account, overall system performance should be improved as the more critical activities are given heightened priority when competing for common system resources.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system, comprising:
   a host bridge;
   a plurality of CPUs coupled to said host bridge;
   a system resource coupled to said host bridge; and
   wherein said host bridge includes storage for CPU task priorities, each CPU being capable of informing the host bridge of its task priority, and said host bridge uses said task priorities to decide how to allocate said system resource to a CPU from among a plurality of the CPUs that request access to said system resource.

2. The computer system of claim 1 wherein said storage in said host bridge includes a table in which said host bridge stores said task priorities.

3. The computer system of claim 2 wherein said table includes an entry for each of said CPUs, a task priority for a CPU being stored in the entry corresponding to that CPU.

4. The computer system of claim 1 wherein each of said CPUs transmits its task priority to said host bridge via a cycle on a bus interconnecting said CPU and said host bridge.

5. The computer system of claim 4 wherein said cycle also includes a request by the CPU for access to said system resource.

6. The computer system of claim 4 wherein said cycle is separate from a cycle in which said CPUs request access to said system resource.

7. The computer system of claim 1 wherein said system resource comprises memory.

8. The computer system of claim 1 wherein said system resource includes a peripheral device coupled to said host bridge.

9. The computer system of claim 1 wherein said host bridge uses said task priorities as the sole criterion for deciding how to allocate said system resource.

10. The computer system of claim 1 wherein said host bridge decides how to allocate said system resource based on said task priorities and based on an anti-starvation algorithm.

11. The computer system of claim 1 wherein said host bridge decides how to allocate said system resource based on said task priorities and based on a tie breaking algorithm that is used when two or more CPUs have the highest, yet equal, task priority.

12. The computer system of claim 1 wherein said host bridge decides how to allocate said system resource based on an algorithm that does not involve said task priorities, but uses said task priorities to decide the resource allocation when the non task priority-based algorithm is unable to decide between competing CPU requests for the system resource.

13. The computer system of claim 1 wherein said host bridge decides how to allocate said system resource based on said task priorities and based on other criteria.

14. A method of arbitrating for access to system resources, comprising:
   (a) receiving a plurality of cycle requests from a plurality of CPUs, each cycle request requesting access to a system resource on behalf of a CPU;
   (b) receiving task priorities associated with each of said CPUs; and
   (c) granting access to the system resource based, at least in part, on said task priorities.

15. The method of claim 14 wherein (c) includes using task priorities as the sole criterion for deciding how to grant access to a system resource.

16. The method of claim 14 wherein (c) includes using said task priorities and an anti-starvation algorithm to grant access to the system resource.

17. The method of claim 14 wherein (c) includes granting access also based on a tie breaking algorithm that is used when two CPUs have equal task priorities.

18. The method of claim 14 wherein (c) includes granting access based on an algorithm that initially does not involve said task priorities, but uses said task priorities when the non task priority-based algorithm is unable to how to grant access.

19. The method of claim 14 wherein (c) also includes granting access based on other criteria.

20. The method of claim 14 wherein said system resource includes memory.

21. The method of claim 14 wherein said system resource includes a CPU.

22. A system, comprising:
   a bridge;
   a plurality of CPUs coupled to said bridge; and
   a system resource coupled to said bridge;
   wherein each CPU is capable of informing the bridge of its task priority, and said bridge uses said task priorities when deciding how to allocate said system resource to said CPUs; and
   wherein each of said CPUs Is capable of transmitting its task priority to said host bridge via a cycle on a bus interconnecting said CPU and said host bridge, said cycle also Includes a request by the CPU for access to said system resource.

23. The system of claim 22 wherein said bridge decides how to allocate said system resource based on said task priorities and based on an anti-starvation algorithm.

24. The system of claim 22 wherein said bridge decides how to allocate said system resource based on an algorithm that does not involve said task priorities, but uses said task priorities to decide the resource allocation when the non task priority-based algorithm is unable to decide between competing CPU requests for the system resource.

25. A system, comprising:
   a bridge;
   a plurality of CPUs coupled to said bridge;
   a system resource coupled to said bridge; and
   wherein each CPU is capable of informing the bridge of its task priority, and wherein said bridge decides how to allocate said system resource based on said task priorities and based on an anti-starvation algorithm.

26. The system of claim 25 wherein each of said CPUs is capable of transmitting its task priority to said bridge via a cycle, and said cycle also includes a request by the CPU for access to said system resource.

27. A system, comprising:
   a bridge;
   a plurality of CPUs coupled to said bridge;
   a system resource coupled to said bridge: and
   wherein each CPU is capable of informing the bridge of its task priority, and wherein said bridge decides how to allocate said system resource based on an algorithm that does not involve said task priorities, but uses said task priorities to decide the resource allocation when the non task priority-based algorithm is unable to decide between competing CPU requests for the system resource.

28. The system of claim 27 wherein each of said CPUs is capable of transmitting its task priority to said bridge via a cycle on a bus interconnecting said CPU and host bridge and said cycle also includes a request by the CPU for access to said system resource.

* * * * *